(12) United States Patent
Kreucher et al.

(10) Patent No.: US 11,788,766 B2
(45) Date of Patent: Oct. 17, 2023

(54) HEATING VENTILATION AND AIR CONDITIONING (HVAC) UNIT

(71) Applicant: VALEO CLIMATE CONTROL CORP., Auburn Hills, MI (US)

(72) Inventors: Jason Kreucher, Auburn Hills, MI (US); Gregory Rademacher, Auburn Hills, MI (US); Heather Hartman, Auburn Hills, MI (US)

(73) Assignee: VALEO CLIMATE CONTROL CORP., Auburn Hills, MI (US)

( * ) Notice: Subject to any disclaimer, the term of this patent is extended or adjusted under 35 U.S.C. 154(b) by 0 days.

(21) Appl. No.: 17/090,270

(22) Filed: Nov. 5, 2020

(65) Prior Publication Data

US 2022/0136732 A1  May 5, 2022

(51) Int. Cl.
*F24F 13/14* (2006.01)
*B60H 1/00* (2006.01)

(52) U.S. Cl.
CPC ..... *F24F 13/1426* (2013.01); *B60H 1/00671* (2013.01)

(58) Field of Classification Search
CPC ...... F24F 13/1426; F24F 13/14; F24F 13/142; B60H 1/00671; H02K 5/225; F16K 31/05
USPC .................................................... 454/363
See application file for complete search history.

(56) References Cited

U.S. PATENT DOCUMENTS

| 4,744,290 | A | * | 5/1988 | Josephson | F24F 13/1486 403/388 |
| 6,059,260 | A | * | 5/2000 | Jacob | F16K 31/046 454/61 |
| 6,082,704 | A | * | 7/2000 | Grinbergs | F16K 1/221 251/96 |
| 7,900,889 | B2 | * | 3/2011 | Tanghetti | F16K 31/607 251/287 |

(Continued)

FOREIGN PATENT DOCUMENTS

| JP | 07-005822 U | * | 1/1995 | ............... B60H 1/00 |
| JP | H07-005822 U | | 1/1995 | |

(Continued)

OTHER PUBLICATIONS

JP-07-005822-U Machine Translation (Year: 2022).*

(Continued)

*Primary Examiner* — Steven S Anderson, II
*Assistant Examiner* — Andrew W Cheung
(74) *Attorney, Agent, or Firm* — Osha Bergman Watanabe & Burton LLP (57) ABSTRACT

A HVAC unit includes a housing, at least one flap and an actuator corresponding to the flap. The housing includes a first and a second portion and defining an enclosure "E". The flap is received inside the housing with a first extreme end thereof engaging with the first portion and a second extreme end thereof engaging with the second portion of the housing via an intermediate lever. The actuator disposed outside the enclosure "E" is connected to and drives the flap via the intermediate lever. The intermediate lever includes a stopper (Continued)

radially extending from at least a portion of a periphery thereof. The stopper is disposed between the second portion of the housing and the flap to limit axial movement of the intermediate lever.

8 Claims, 9 Drawing Sheets

(56) References Cited

U.S. PATENT DOCUMENTS

| | | | | |
|---|---|---|---|---|
| 8,789,807 | B2* | 7/2014 | Kreuter | F16K 31/055 251/293 |
| 8,820,343 | B2* | 9/2014 | Evertz | F16B 5/04 251/291 |
| 9,877,928 | B2* | 1/2018 | Tinsley | A61K 31/05 |
| 2002/0030172 | A1* | 3/2002 | Twito | F24F 13/14 251/305 |
| 2005/0040715 | A1* | 2/2005 | Nesic | H02K 11/38 310/71 |
| 2006/0079165 | A1* | 4/2006 | Bowler | B60H 1/00671 454/69 |
| 2007/0175518 | A1* | 8/2007 | Vincent | B60H 1/00521 403/348 |
| 2014/0308890 | A1* | 10/2014 | Schneider | B60H 1/00857 454/335 |
| 2018/0162714 | A1* | 6/2018 | Doelman | B67D 1/0864 |
| 2019/0017724 | A1* | 1/2019 | Sekar | F24F 13/1426 |

FOREIGN PATENT DOCUMENTS

| | | | | |
|---|---|---|---|---|
| KR | 102056778 B1 | 12/2019 | | |
| WO | WO-2014100885 A1 * | 7/2014 | | B60H 1/00685 |
| WO | WO-2015048895 A1 * | 4/2015 | | F24C 15/2021 |

OTHER PUBLICATIONS

Written Opinion of the International Searching Authority in corresponding International Application No. PCT/US2021/058279, dated Feb. 23, 2022 (4 pages).

* cited by examiner

HEATING VENTILATION AND AIR CONDITIONING (HVAC) UNIT

FIELD OF THE INVENTION

The present invention relates to a Heating Ventilation and Air-Conditioning (HVAC) unit for a vehicle, particularly, the present invention relates to a housing and flap assembly for a HVAC unit.

BACKGROUND

Figure 1A:
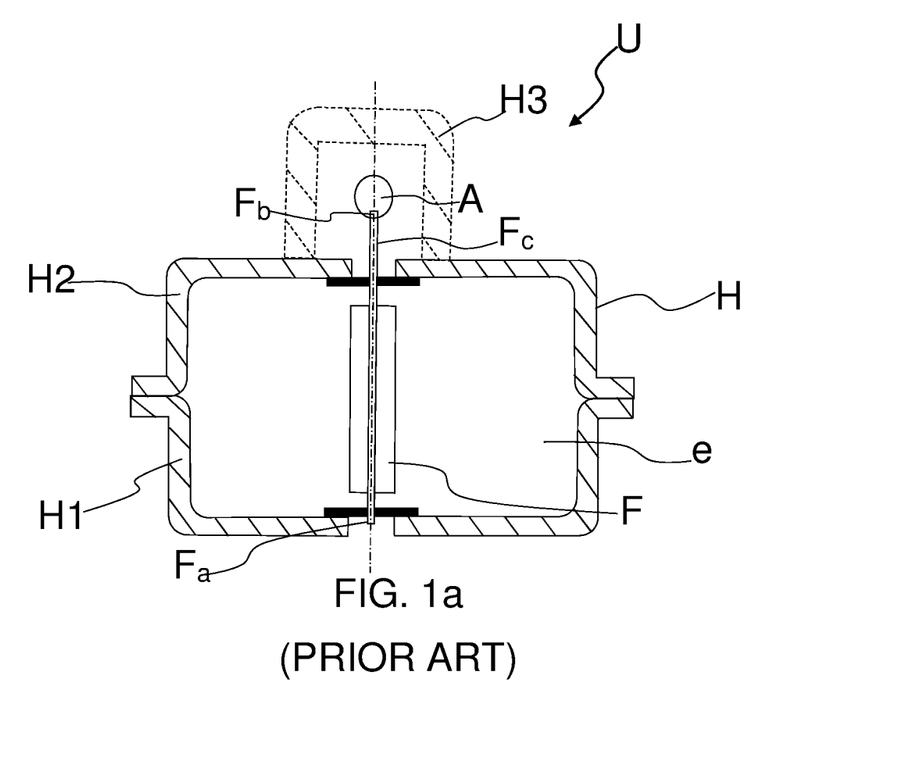
FIG. 1a illustrates a schematic representation of a conventional HVAC unit configured with a HVAC housing—flap assembly in accordance with a prior art.
Figure 1B:
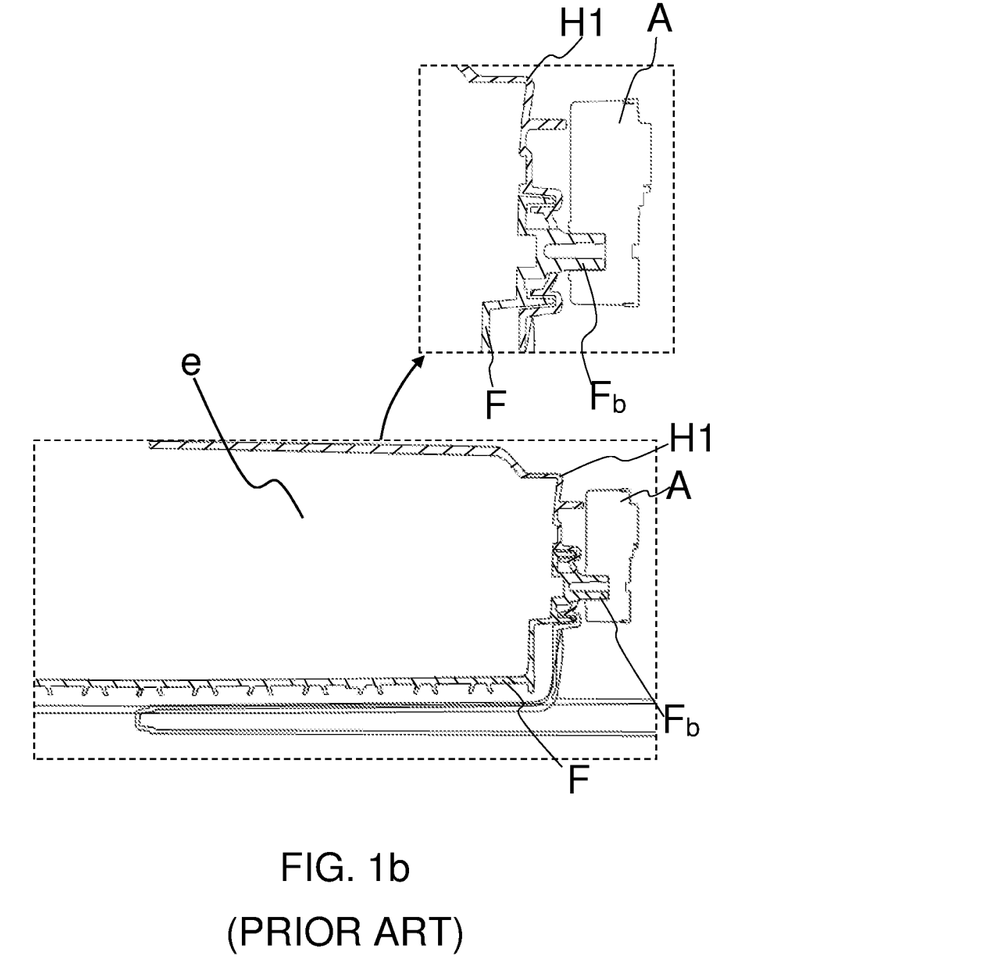
FIG. 1b illustrates a sectional representation of the HVAC housing—flap assembly of FIG. 1a, depicting a male star drive integrally formed with a flap and extending out of an enclosure defined by a first and second portion of a housing, to be connected to an actuator.

Generally, a HVAC unit "U" as illustrated in FIG. 1a and FIG. 1b includes a HVAC housing "H", simply referred to as housing "H" that encloses a plurality of flaps "F". The housing "H" includes a first portion "H1" and the second portion "H2" that define an enclosure "e". Apart from the first portion "H1" and the second portion "H2", the housing "H" optionally includes a protection cover "H3" as illustrated in FIG. 1a. The housing "H" of the HVAC unit "U" further encloses an evaporator, a heater and a blower (not shown in FIGS.). The blower generates pressure difference across at least one of the evaporator and the heater to cause fluid (air to be conditioned) to flow through at least one of the evaporator and the heater. The multiple flaps "F" disposed around the heater and the evaporator operate in conjunction to regulate flow of fluid processed by at least one of the evaporator and the heater to deliver different combination of fluid temperatures at the different vents/outlets. However, for better understanding, the enclosure "e" of FIG. 1a and FIG. 1b is depicting with a single flap "F" received therein. The flap "F" is directly connected to and actuated by an actuator "A". Optionally, the actuator "A" is covered by the protection cover "H3". More specifically, in case the HVAC housing "H" includes the protection cover "H3" along with the first and second portions "H1" and "H2", the actuator "A" is disposed inside the housing "H", however, the actuator "A" is still outside the enclosure "e" defined by the first and the second portions "H1" and "H2" respectively.

Referring to FIG. 1a and FIG. 1b, the flap "F" is disposed inside the enclosure "e", whereas the corresponding actuator "A" to actuate the flap movement is disposed outside the enclosure "e". Generally, the flap "F" includes a first engagement element "$F_a$" and a second engagement element "$F_b$" that is generally a male star drive "$F_b$" integrally formed with the flap "F" along a flap axle "$F_c$". The first engagement element "$F_a$" engages with the first portion "H1" of the housing "H" and the second engagement element "$F_b$" passes through an aperture formed on the second portion "H2" of the housing "H" and engages with the actuator "A" disposed outside the enclosure "e". The actuator "A" drives the flap "F". The flap "F" along with the male star drive "$F_b$" integrally formed therewith is of polypropylene reinforced with 40 percent talcum, i.e. PPT 40. However, due to large number of operating cycles, the flap "F" of such configuration is subjected to fatigue failure resulting in warranty issues. In order to avoid the fatigue failure and warranty issues of the flap "F", the flap "F" along with the male star drive "$F_b$" integrally formed therewith can be of fiber reinforced resin material that exhibits high fatigue strength. However, such configuration of the flap "F" substantially increases the manufacturing cost of flap "F".

Figure 2A:
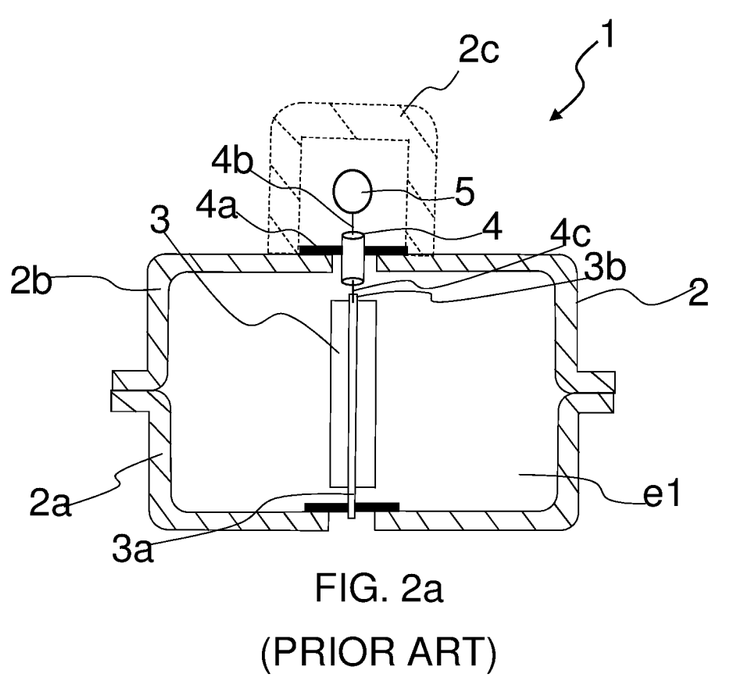
FIG. 2a illustrates a schematic representation of another conventional HVAC unit configured with a HVAC housing—flap assembly in accordance with another prior art.
Figure 2B:
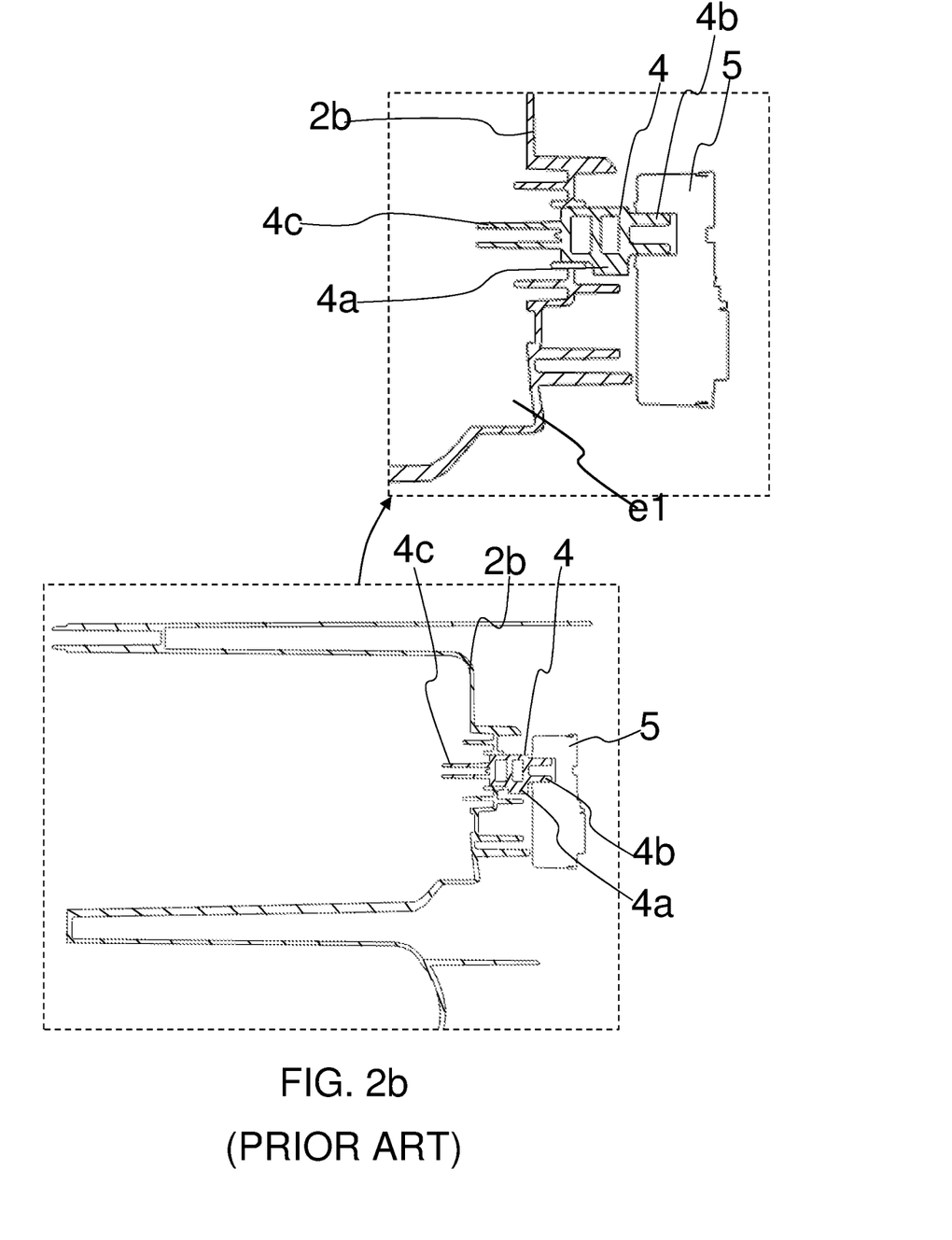
FIG. 2b illustrates a sectional representation of the HVAC housing—flap assembly of FIG. 2a depicting an intermediate lever with substantial portion thereof outside an enclosure defined by a first and a second portion of a housing.

In order to overcome fatigue failure and warranty issues faced by the flaps, without increasing the overall cost of the flap, another conventional HVAC unit 1, hereinafter referred as HVAC unit 1 as illustrated in FIG. 2a and FIG. 2b is generally used. The HVAC unit 1 includes a HVAC housing 2, simply referred to as a housing 2 that encloses a plurality of flaps 3 along with other elements. The housing 2 includes a first portion 2a and the second portion 2b that define an enclosure "e1". Apart from the first portion 2a and the second portion 2b, the housing 2 optionally includes a protection cover 2c as illustrated in FIG. 2a. Each of the plurality of flaps 3 is indirectly connected to and driven by a respective actuator 5 disposed outside the enclosure "e1" via a corresponding intermediate lever 4. Although, there can be multiple flaps 3 disposed inside the enclosure "e1", however, for better understanding, a single flap 3 is depicted in the enclosure "e" 1 of the FIG. 2a and FIG. 2b. Particularly, in case of the HVAC unit 1, the intermediate lever 4 connects the corresponding flap 3 and the actuator 5, wherein the flap 3 and intermediate lever 4 are of different material. Particularly, the flap 3 is of PPT 40 material and the intermediate lever 4 is of fiber reinforced resin material, particularly, either one of PA66 GF30 material and PBT GF30 material that can withstand high operating cycles without encountering fatigue failure due to high fatigue strength of the fiber reinforced resin material. Although, the intermediate lever 4 formed separately from the flap 3, connected to the flap 3 on one side thereof and connected to the actuator 4 on another side thereof, addresses the warranty issues and cost issues, however, such configuration of the flap 3 is subject to other problems.

More specifically, the intermediate lever 4 includes a stopper 4a formed along periphery thereof to define angular movement of the flap 3. The stopper 4a and a substantial portion of the intermediate lever 4, particularly, a first extreme end 4b of the intermediate lever 4 extends out of the enclosure "e1" and is connected to the actuator 5 disposed outside the enclosure "e1", thereby causing packaging issues. More specifically, the stopper 4a is disposed between an exterior of the second portion 2b of the housing 2 and the actuator 5. Further, during assembly of the HVAC unit 1, firstly, a first extreme end 3a of the flap 3 is installed to a first portion 2a of the housing 2, subsequently, a second portion 2b of the housing 2 and a second extreme end 3b of the flap 3 are assembled. Thereafter, at least a portion of the intermediate lever 4 is inserted into the housing 2 through a complementary aperture formed on the second portion 2b of the housing 2 to engage with the second extreme end 3b of the flap 3 disposed inside the enclosure "e1" defined by first and second portions 2a and 2b of the housing 2. Particularly, the first extreme end 4b of the intermediate lever 4 engages with the actuator 5 disposed outside the enclosure "e1", whereas a second extreme end 4c of the intermediate lever 4 engages with the flap 3 disposed inside the enclosure "e1". With such configuration of the HVAC unit 1 and assembly method thereof, the second portion 2b of the housing 2 is assembled to the flap 3 before the intermediate lever 4 is installed to the flap 3. Accordingly, there is no guide for the assembly between the flap 3 and the second portion 2b of the housing 2. As such, the assembly is inconvenient and time consuming. Further, with such configuration of the HVAC unit 1, the intermediate lever 4 is loosely held and likely to be misplaced during service of the actuator 5, particularly, when the actuator 5 is removed from the intermediate lever 4, after removal of the protection cover 2c. The intermediate lever 4 is expensive and essential element and the misplacement thereof during service of the actuator is an issue.

SUMMARY OF THE INVENTION

Accordingly, there is a need for a HVAC unit that obviates the problem of warranty issues arising due to fatigue failure of flap, without increasing the overall costs.

An object of the present invention is to provide a HVAC unit and a HVAC housing-flap assembly thereof that obviates the problem of warranty issues arising due to fatigue failure of flap, without increasing the overall costs.

Another object of the present invention is to provide a HVAC unit and a HVAC housing—flap assembly thereof that addresses packaging issues, assembly inconvenience and part misplacement issues during service and maintenance faced by conventional HVAC units and methods of assembly thereof.

Still another object of the present invention is to provide a HVAC unit and a HVAC housing-flap assembly thereof that is convenient and quick to assembly.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

A Heating Ventilation and Air Conditioning (HVAC) unit (hereinafter referred to as HVAC unit) is disclosed in accordance with an embodiment of the present invention. The HVAC unit includes a HVAC housing, at least one flap and an actuator corresponding to the flap. The HVAC housing includes a first portion and a second portion defining an enclosure. The flap is received inside the enclosure with a first extreme end thereof engaging with the first portion and a second extreme end thereof engaging with the second portion of the housing via an intermediate lever. The actuator corresponding to the flap is disposed outside the enclosure. The actuator is connected to and drives the flap via the intermediate lever. The intermediate lever includes a stopper radially extending from at least a portion of a periphery thereof. The stopper is disposed between the second portion of the HVAC housing and the flap, to limit axial movement of the intermediate lever.

In one or more embodiments, the first portion and the second portion of the HVAC housing are separate from each other and assembled to each other to define the enclosure.

Specifically, the stopper is at least one radially extending element that interacts with a pair of depressions inwardly extending from the second portion of the HVAC housing into the enclosure to define angular movement of the flap.

Further, the intermediate lever includes a first engagement element and a second engagement element on opposite sides of the stopper that engages with the actuator and the flap respectively.

Specifically, in one or more embodiments, at least one of the first engagement element and the second engagement element is a male feature that engages with complementary female feature formed on at least one of the respective actuator and the flap.

More specifically, the first engagement element is a male star drive.

Alternatively, at least one of the first engagement element and the second engagement element is a female feature that engages with complementary male feature formed on at least one of the respective actuator and the flap.

In one or more embodiments, the flap is of polypropylene, polypropylene reinforced with 40 percent talcum, PPT 40 material whereas the intermediate lever is of reinforced glass fiber resin, particularly, either one of PA66 GF30 material and PBT GF30 material.

Also is disclosed a method of assembling a Heating Ventilation and Air-Conditioning (HVAC) unit in accordance with an embodiment of the present invention. The method includes the steps of installing a flap to a first portion of a HVAC housing by engaging a first extreme end thereof with the first portion of the HVAC housing. Thereafter, installing an intermediate lever to a second extreme end of the flap. Subsequently, assembling a second portion of the HVAC housing and the flap via the intermediate lever. Particularly, guiding a portion of the intermediate lever on one side of a stopper formed thereon through a complementary through aperture formed on the second portion of the HVAC housing and limiting axial movement of the intermediate lever as the stopper is disposed between the flap and the second portion of the HVAC housing. Finally, installing the actuator to at least a portion of the intermediate lever extending out of an enclosure defined by first portion and the second portion of the HVAC housing.

Optionally, the method of method of assembling a Heating Ventilation and Air-Conditioning (HVAC) unit includes the step of mounting a protection cover over the actuator.

BRIEF DESCRIPTION OF THE DRAWINGS

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein:

FIG. 6 illustrates a flow chart depicting the steps involved in the method for assembling the HVAC unit of FIG. 3a.

It must be noted that the figures disclose the invention in a detailed enough way to be implemented, said figures helping to better define the invention if needs be. The invention should however not be limited to the embodiment disclosed in the description.

DETAILED DESCRIPTION

Although, the present invention is explained with example of HVAC unit with a HVAC housing—flap assembly, wherein an intermediate lever is connected to an actuator disposed outside an enclosure at a first extreme end thereof. Further, the intermediate lever is connected to a flap disposed inside an enclosure defined by a first and a second portion of a HVAC housing, at a second extreme end thereof. The intermediate lever and the flap are of different material. Particularly, the flap is of PPT 40 material, whereas the intermediate lever is of glass fiber reinforced resin material, particularly, PA66GF30 material or PBT GF30 material that exhibits high fatigue strength. With such configuration, the warranty issues arising due to fatigue failure of the convention flap with star male drive integrally formed thereto, due to the conventional flap subjected to large number of operating cycles is addressed. Also, the flap of the present invention is comparatively inexpensive compared to conventional flap with male star drive integrally formed therewith of high fatigue strength material. The intermediate lever includes a stopper disposed along a periphery thereof to define angular movement of the flap connected thereto. The axial movement of the stopper is limited between inside wall of the second portion of the housing and the flap to limit the axial movement of the intermediate lever to prevent misplacement of the intermediate lever, when the actuator is dis-assembled from the housing for service and maintenance of the actuator. However, the present invention is not limited to HVAC unit for a vehicle and HVAC housing-flap assembly for the HVAC unit only.

The present invention is also applicable to other vehicular and non-vehicular applications, wherein an intermediate lever connects an actuator and an actuated element disposed inside and outside of an enclosure, where it is required to address the warranty issues, packaging issues, assembly inconvenience and part misplacement issues without increasing the overall cost.

A conventional HVAC unit "U" includes a flap "F" received in a housing "H". Generally, the flap "F" includes a first engagement element $F_a$, a second engagement element "$F_b$", that is a male star drive "$F_b$" integrally formed with the flap "F" along a flap axle "$F_c$". The first engagement element "$F_a$" engages with a first portion "H1" of the housing "H". The second engagement element "$F_b$" passes through the aperture formed on a second portion "H2" of the housing "H". The second engagement element "$F_b$" engages with the actuator "A" disposed outside an enclosure "e" formed by the first portion H1 and the second portion H2 of the housing "H". The actuator "A" drives the flap "F". The flap "F" along with the male star drive "$F_b$" integrally formed therewith is of polypropylene reinforced with 40 percent talcum, i.e. PPT 40 that exhibits limited fatigue strength. However, due to large number of operating cycles, the flap "F" of such configuration is subjected to fatigue failure resulting in warranty issues. The flap "F" along with the male star drive "$F_b$" integrally formed therewith can be of fiber reinforced resin material that exhibits high fatigue strength. However, such configuration of the flap "F" substantially increases the manufacturing cost of flap "F".

FIG. 2a illustrates a schematic representation of another conventional HVAC unit 1, referred to as HVAC unit 1, configured with a conventional HVAC housing—flap assembly. FIG. 2b illustrate schematic sectional representation of the conventional HVAC housing—flap assembly of the HVAC unit 1. The HVAC unit 1 includes a HVAC housing 2, referred to as housing 2, at least one flap 3, an intermediate lever 4 connecting an actuator 5 and the corresponding flap 3. The housing 2 includes a first portion 2a and a second portion 2b that define an enclosure "e1" enclosing the flap 3 along with other elements. The housing 2 may optionally include a protection cover 2c to cover the actuator 5 disposed outside the enclosure "e1". The intermediate lever 4 is separate from the flap 3 and is connected to the flap 3 at one end thereof and to the actuator 5 at the other end thereof. The intermediate lever 4 includes a stopper 4a radially extending from at least a portion of a periphery thereof. In one embodiment, the stopper 4a interacts with a pair of protrusions outwardly extending from the housing 2 to define angular movement of intermediate lever 4 and the flap 3 connected to the intermediate lever 4. The intermediate lever 4 connects the flap 3 disposed inside the enclosure e1 to the corresponding actuator 5 disposed outside the enclosure e1. More specifically, the intermediate lever 4 includes a first engagement element 4b that is connected to the actuator 5 and a second engagement element 4c connected to the flap 3.

The flap 3 and the intermediate lever 4 are of different material. More specifically, the flap 3 is of PPT 40 material and the intermediate lever 4 is of fiber reinforced resin material that exhibits high fatigue strength but is expensive compared to the PPT 40 material. Such configuration addresses the guarantee issues arising due to fatigue failure. However, the stopper 4a and the protrusions extending outwardly from the second portion 2b of the housing 2 and interacting with the stopper 4a to define angular movement of the flap 3 are outside the enclosure e1. Further, a substantial portion of the intermediate lever 4 connected to the actuator 5 disposed outside the enclosure e1, protrude/extend out of the enclosure e1, thereby causing packaging issues.

Further, the conventional method of assembly of the HVAC unit 1 involves installing a first extreme end 3a of the flap 3 to a first portion 2a of the housing 2. Subsequently, assembling a second portion 2b of the housing 2 and a second extreme end 3b of the flap 3. Thereafter, inserting at least a portion of the intermediate lever 4 into the housing 2 through a complementary aperture formed on the second portion 2b of the housing 2 to engage with the second extreme end 3b of the flap 3. Finally connecting the actuator 5 to a portion of the intermediate lever 4 remaining out of the housing 2 and mounting the actuator 5 to an external surface of the second portion 2b of the housing 2. This way, the intermediate lever 4 is connected to the flap 3 disposed inside an enclosure "e1" and to the actuator 5 disposed outside of the enclosure "e1", wherein the enclosure 'e1" is defined by the first and second portion 2a and 2b of the housing 2. In the conventional method of assembly the HVAC unit 1, the second portion 2b of the housing 2 and the flap 3 are assembled before the intermediate lever 4 is installed to the flap 3. Accordingly, there is no guide for the assembly between the flap 3 and the housing 2 and the assembly is inconvenient and time consuming. Further, with such configuration of the HVAC unit 1 and a method of assembly thereof, the intermediate lever 4 is loosely held and likely to be misplaced during service of the actuator 5. More specifically, when the actuator 5 is removed for maintenance/service, the intermediate lever 4 is free to move and can be misplaced.

Figure 3A:
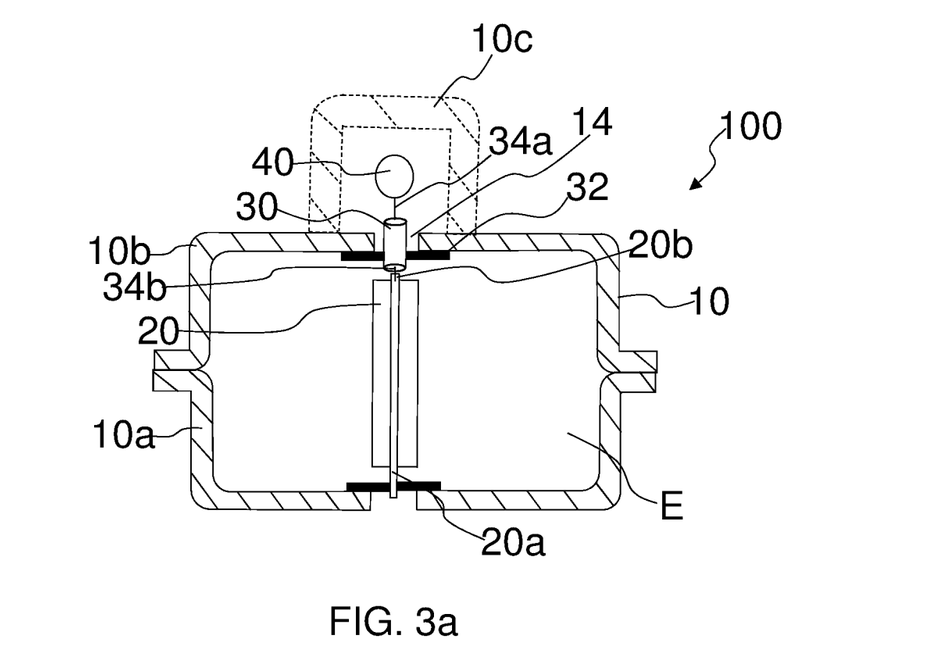
FIG. 3a illustrates a schematic representation of a HVAC unit configured with a HVAC housing—flap assembly in accordance with the present invention.
Figure 3B:
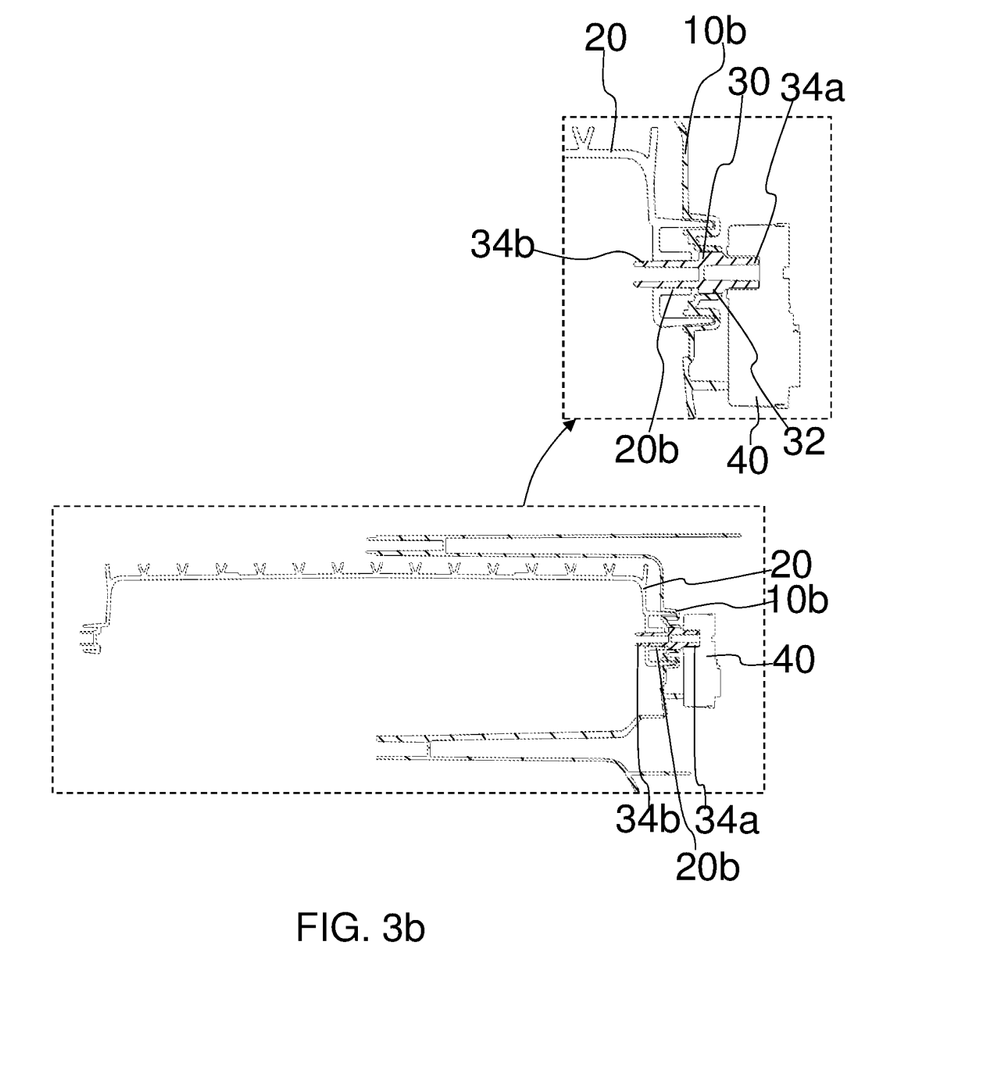
FIG. 3b illustrates a sectional representation of the HVAC housing—flap assembly of FIG. 3a depicting an intermediate lever with substantial portion thereof disposed inside an enclosure defined by a first and a second portion of a housing.

FIG. 3a illustrates a schematic representation of a HVAC unit 100 configured with a HVAC housing—flap assembly of the present invention. FIG. 3b illustrates a schematic sectional representation of the HVAC housing—flap assembly of the HVAC unit 100. The HVAC unit 100 includes a HVAC housing 10, hereinafter referred to as a housing 10, at least one flap 20, an intermediate lever 30 and an actuator 40 corresponding to the flap 20.

The housing 10 includes a first portion 10a and a second portion 10b defining an enclosure "E". Generally, the housing 10 is of modular construction, particularly, the first portion 10a and the second portion 10b of the housing 10 are separate from each other and can be assembled to each other to define the enclosure "E" to receive and securely hold various elements of the HVAC unit such as evaporator, heater element, flaps etc. Such modular construction of the housing 10 provides access to the various elements of the HVAC unit 100 such as the evaporator, the heater, the blower motor and the flaps disposed inside of the housing 10 and enables serviceability and maintenance of the elements disposed inside the housing 10. Apart from the first portion 10a and the second portion 10b, the housing 10 optionally includes a corresponding protection cover 10c as illustrated in FIG. 3a to cover the actuator 40 corresponding to the respective flap 20. Specifically, the cover 10c protects the respective actuator 40 against detrimental external environment. More specifically, in case the HVAC housing 10 includes the protection cover 10c along with the first and second portions 10a and 10b, the actuator 40 is disposed inside the housing 10 however, the actuator 40 is still outside the enclosure "E" defined by the first and the second portions 10a and 10b respectively. However, the present invention is not limited to any particular configuration of the housing 10 or whether the housing 10 is of modular construction or of unitary construction, as far as the housing 10 encloses and securely holds the various elements of the HVAC unit 100.

The flap 20 is of polypropylene, polypropylene reinforced with 40 percent talcum, PPT 40 material that exhibits comparatively limited fatigue strength and is comparatively inexpensive than reinforced glass fiber resin such as for example, PA66 GF30 material and PBT GF30 material. The flap 20 is received inside the enclosure "E" with a first extreme end 20a thereof engaging with the first portion 10a of the housing 10 and a second extreme end 20b thereof engaging with the second portion 10b of the housing 10 via the intermediate lever 30. Although, there could be multiple flaps 20 disposed inside the housing 10, however, for better understanding, single flap 20 is depicted in the FIG. 3a and FIG. 3b. The flap 20 angularly moves between different positions to regulate flow of fluid processed (conditioned air) by at least one of the evaporator and the heater to deliver different combinations of fluid temperatures at the different vents/outlets. The vents are configured on the housing 10 and direct the conditioned air to a passenger cabin of the vehicle. The flap 20 can also move between a first and second position thereof to switch between a re-circulation mode and a fresh air mode of operation. The flap 20 could be any type of flap, the present invention is not limited to any particular configuration of the flap as far as the flap is capable of being actuated and driven between different positions to define different operating configurations thereof.

The actuator 40 for the respective flap 20 is disposed outside the enclosure "E". More specifically, the actuator 40 is mounted to an exterior side of the second portion 10b of the housing 10 by means of bolts 42 as illustrated in the exploded view of the HVAC housing—flap assembly depicted in FIG. 5. The actuator 40 can also be mounted on the second portion 10b of the housing 10 by other means. For ease of understanding, only a portion of the second portion 10b of the housing 10 is illustrated in the FIG. 5. The actuator 40 is connected to and drives the flap 20 via the intermediate lever 30. The actuator 40 can be a motor or any other drive. The present invention is not limited to any particular configuration of the actuator as far as the actuator is capable of driving the flap 20 to impart angular movement to the flap 20 to define different operating configurations of the flap 20.

The intermediate lever 30 forms connection between the actuator 40 and the flap 20 for driving the flap 20. The intermediate lever 30 includes a stopper 32, a first engagement element 34a and a second engagement element 34b.

Figure 4:
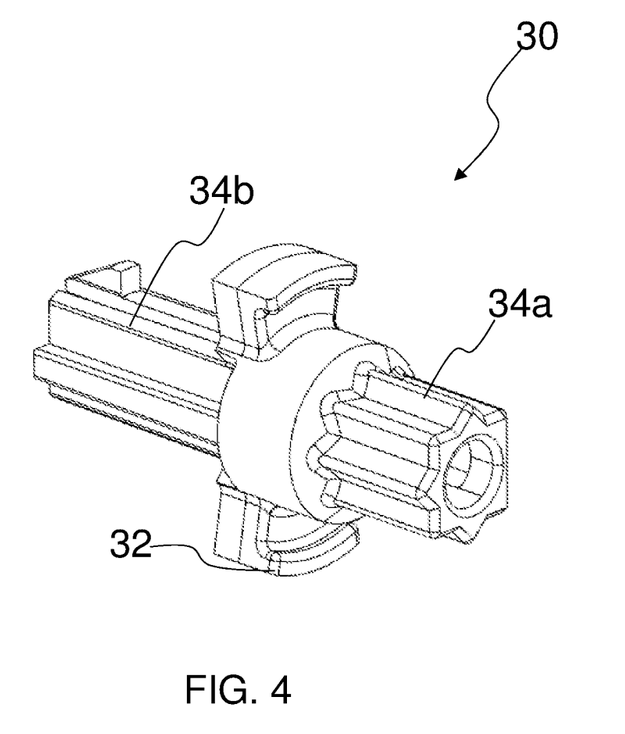
FIG. 4 illustrates an isometric view of the intermediate lever of the HVAC housing—flap assembly of FIG. 3b.
Figure 5:
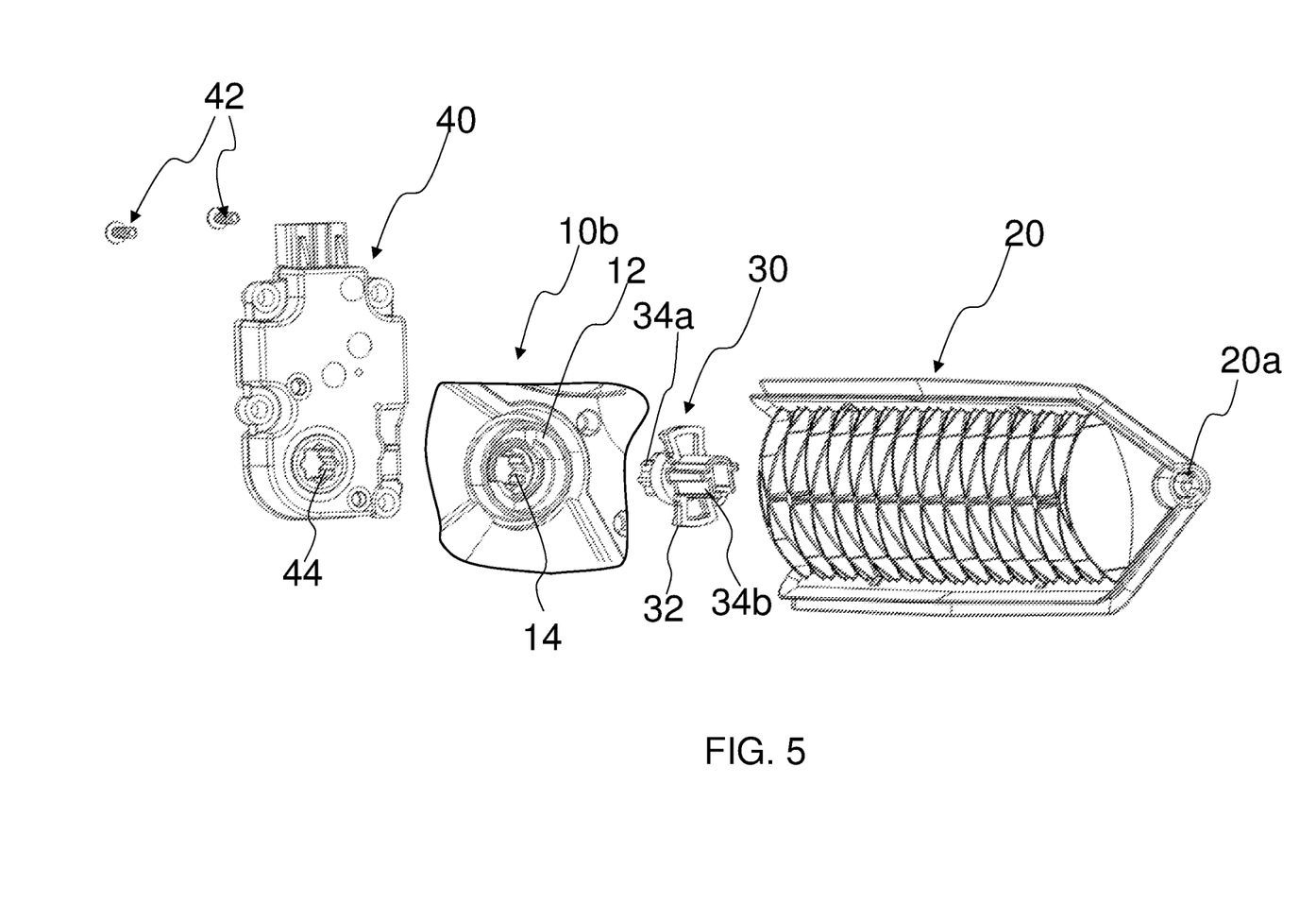
FIG. 5 illustrates an exploded view of the HVAC housing—flap assembly of FIG. 3b.

FIG. 4 illustrates an isometric view of the intermediate lever 30. FIG. 5 illustrates an exploded view of the HVAC housing—flap assembly of the HVAC unit 100. The intermediate lever 30 is separate from and of different material than material of the flap 20. For example, the flap 20 is of polypropylene, polypropylene reinforced with 40 percent talcum, PPT 40 material that exhibits comparatively limited fatigue strength and is comparatively inexpensive than reinforced glass fiber resin. Whereas the intermediate lever 30 is of reinforced glass fiber resin that exhibits comparatively higher fatigue strength than material of the flap, i.e. PPT 40 material. More specifically, the intermediate lever 30 is of PA66 GF30 material. The PA66 GF30 material is a 30 percent glass fiber reinforced Polyamide (PA) 66. The PA66 GF30 demonstrates outstanding mechanical properties such as higher strength, rigidity, creep strength and dimensional stability. Alternatively, the intermediate lever 30 is of PBT GF30 material PBT that is also 30 percent glass fiber reinforced material exhibiting similar properties as PA66 GF30 material. With such configuration, fatigue failure issues faced by the conventional flap with star male drive integrally formed thereto and the conventional flap being of material exhibiting limited fatigue strength is addressed without increasing the overall cost of the flap.

The stopper 32 radially extends from at least a portion of a periphery of the intermediate lever 30. Referring to FIG. 5, the stopper 32 is at least one radially extending element that interacts with a pair of depressions 12 inwardly extending from the second portion 10b of the HVAC housing 10 into the enclosure "E" to define angular movement of the flap 20. More specifically, the depressions 12 limit the angular movement of the intermediate lever 30 driven by the actuator 40 and accordingly, defines the angular movement of the flap 20 connected to the intermediate lever 30. However, the present not limited to any particular configuration or arrangement for define angular movement of the flap 20 connected to the intermediate lever 30. For ease of understanding, only a portion of the second portion 10b of the housing 10 is illustrated in the FIG. 5. The stopper 32 is disposed within the enclosure "E" and axial movement, if any of the stopper 32 is limited between the second portion 10b of the housing 10 and the flap 20 to limit axial movement of the intermediate lever 30. With limited axial movement of the intermediate lever 30, the chance of misplacement of the intermediate lever 30 is eliminated when the actuator 40 along with the optional protection cover 10c is dis-assembled from the assembly of the first and second portions 10a and 10b of the housing 10. Whereas in conventional HVAC unit, the intermediate lever is freely held to the flap. Specifically, the intermediate lever of the conventional HVAC unit is easily removable from the flap when the actuator is removed from the second portion of the housing and disconnected from the intermediate lever accordingly, the intermediate lever is more likely to be misplaced when the actuator of the conventional HVAC unit is removed for the service and maintenance thereof. However, the present invention is not limited to any particular configuration of the stopper 32 as far as the stopper is capable of defining the angular movement of the flap 20 and limit axial movement of the intermediate lever 30. With such configuration, the stopper 32 and a substantial portion of the intermediate lever 30 is disposed within the housing 10. The depressions with which the stopper 32 interacts to define the angular movement of the flap 20 are inwardly extending from the second portion of the HVAC housing 10 into the enclosure "E". Only that portion of the intermediate lever 30 that is required to engage to the actuator 40 disposed outside the enclosure "E" extends out of the enclosure "E". Accordingly, such configuration of the HVC unit 100 with minimum protruding/extending parts protruding/extending out of the enclosure "E", addresses the packaging issues faced by conventional HVAC unit.

Again referring to the FIG. 4, the first engagement element 34a and the second engagement element 34b are disposed on opposite sides of the stopper 32. The first engagement element 34a and the second engagement element 34b engages with the actuator 40 and the flap 20 respectively. At least one of the first engagement element 34a and the second engagement element 34b is a male feature that engages with a complementary female feature 44 formed on at least one of the respective actuator 40 and the flap 20. Alternatively, at least one of the first engagement element 34a and the second engagement element 34b is a female feature that receives and engages with complementary male feature formed on at least one of the respective actuator 40 and the flap 20. In one embodiment of the present invention, the first engagement element 34a is a male star drive that is received in and engages with a complementary female feature 44 of the actuator 40 and the second engagement element 34b is a female feature that receives and engages with a complementary male feature of the flap 20. Again referring to the FIG. 5, the first engagement element 34a, particularly, the male star drive 34a of the intermediate lever 30 pass through a complementary through aperture 14 formed on the second portion 10b of the housing 10 and engages with the complementary female feature 44 of the actuator 40 disposed outside the enclosure "E". In another embodiment of the present invention, the first engagement element 34a is a female feature that receives and engages with a complementary male feature of the actuator 40 and the second engagement element 34b is a male feature that is received and engages with a complementary female feature of the flap 20. In still another embodiment, both the first engagement element 34a and the second engagement element 34b are male star drives that are received in and engage with complementary female features of the actuator 40 and the flap 20 respectively. In still another embodiment, both the first engagement element 34a and the second engagement element 34b are female features that receive and engage with complementary male features of the actuator 40 and the flap 20 respectively. However, the present invention is not limited to any particular configuration of the first and the second engagement elements 34a and 34b. Particularly, the present invention is not limited to the first and the second engagement element 34a and 34b being male or female features as far as the first and the second engagement elements enable the intermediate lever 30 to form connection between the actuator 40 and the flap 20 to enable the intermediate lever to transmit drive from the actuator 40 to the flap 20.

Figure 6:
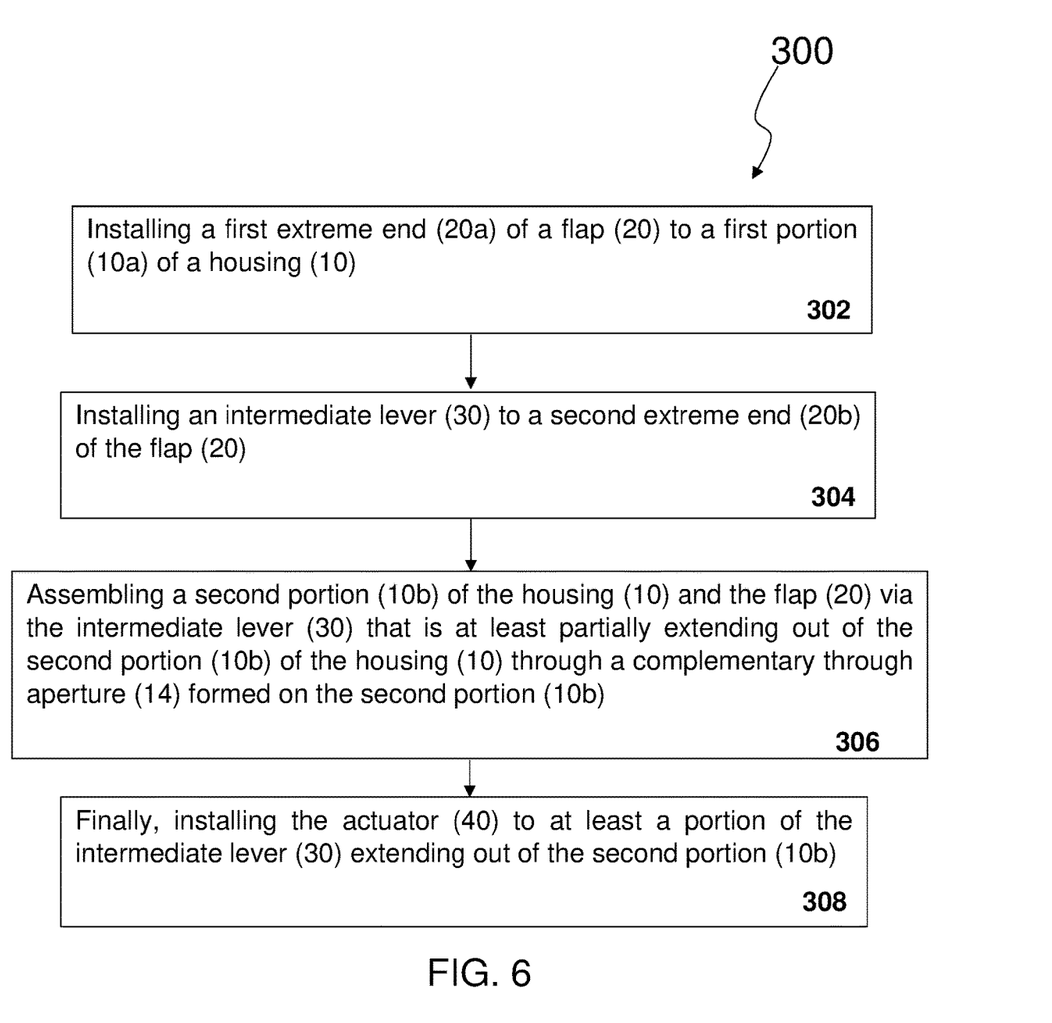

Also, is disclosed a method 300 of assembling a Heating Ventilation and Air-Conditioning (HVAC) unit 100 in accordance with an embodiment of the present invention. FIG. 6 illustrates a flow chart depicting the various steps of the method 300 of assembly that involves installing flap to a first portion of a housing. Thereafter installing an intermediate lever to the flap, assembling second portion of the housing to the flap via the intermediate lever so that flap is enclosed within an enclosure defined by a first and second portion of a housing and at least a portion of the intermediate lever extends out of the enclosure to engage with actuator disposed outside the enclosure. The method 300 is to be understood with reference to the following description along with the FIG. 6.

Referring to the FIG. 6, the method 300 includes a step 302 of installing a flap 20 to a first portion 10a of a housing 10 by engaging a first extreme end 20a of the flap 20 to the first portion 10a of the HVAC housing 10. Thereafter, a step 304 of installing an intermediate lever 30 to a second extreme end 20b of the flap 20. Subsequently, a step 306 of assembling a second portion 10b of the housing 10 and the flap 20 via the intermediate lever 30, wherein the intermediate lever 30, particularly, a first engagement element 34a of the intermediate lever 30 acts as a guide for the assembly between the second portion 10b of the housing 10 and the flap 20. More specifically, the step 306 involves guiding at least a portion of the intermediate lever 30, particularly, the first engagement element 34a on one side of a stopper 32 through a complementary through aperture 14 formed on the second portion 10b of the housing 10. Such assembly limits the axial movement of the intermediate lever 30 as the stopper 32 is disposed between the flap 20 and the second portion 10b of the housing 10. More specifically, by limiting the axial movement of the stopper 32 between the flap 20 and the second portion 10b of the housing 10, the axial movement of the intermediate lever 30 is also limited. Finally, a step 308 involves installing the actuator 40 to at least a portion of the intermediate lever 30 extending out of an enclosure "E" defined by the first portion 10a and the second portion 10b of the housing 10. Specifically, the step 308 involves installing the actuator 40 to at least the portion of the first engagement element 34a extending out of the enclosure "E" and mounting the actuator 40 on external side of the second portion 10b of the housing 10 by using bolts 42.

The method further includes an optional step of mounting a protection cover 10c over the actuator 40, in case the actuator 40 is covered by the protection cover 10c forming a part of the housing 10 and safeguard the actuator 40 against the detrimental of external environment.

With such configuration of the HVAC unit 100 and method of assembly there for, the second portion 10b of the housing 10 is assembled to the flap 20 after the intermediate lever 30 is installed to the flap 20. Accordingly, the intermediate lever 30 guides the assembly between the flap 20 and the second portion 10b of the housing 10, thereby causing the assembly to be inconvenient and quick. Further, with such configuration of the HVAC unit 100, the stopper 32 of the intermediate lever 30 is disposed within the housing 10, particularly, the stopper 32 is held between the internal side of the second portion 10b of the HVAC housing 10 and the flap 20 to limit axial movement of the intermediate lever 30. Accordingly, the axial movement of the intermediate lever 30 is limited. The limited axial movement of the intermediate lever 30 prevents the chances of misplacement of the intermediate lever 30, when the actuator 40 is dis-assembled from the second portion 10b of the housing 10 for maintenance or service of the actuator 40.

Obviously, numerous modifications and variations of the present invention are possible in light of the above teachings. It is therefore to be understood that the invention may be practiced otherwise than as specifically described herein.

In any case, the invention cannot and should not be limited to the embodiments specifically described in this document, as other embodiments might exist. The invention shall spread to any equivalent means and any technically operating combination of means.

What is claimed is:

1. A Heating Ventilation and Air Conditioning (HVAC) unit comprising:
    a HVAC housing comprising a first portion and a second portion defining an enclosure "E";
    at least one flap adapted to be received inside the enclosure "E" with a first extreme end thereof adapted to engage with the first portion and a second extreme end thereof adapted to engage with the second portion via an intermediate lever; and
    an actuator corresponding to the at least one flap and disposed outside the enclosure "E", the actuator being connected to and adapted to drive the at least one flap via the intermediate lever,
    wherein the intermediate lever comprises a stopper radially extending from at least a portion of a periphery thereof, the stopper being disposed between the second portion of the HVAC housing and the at least one flap to limit a movement of the intermediate lever about an axle of the at least one flap,
    wherein the intermediate lever comprises a first engagement element at a first end of the intermediate lever and a second engagement element at a second end of the intermediate lever, wherein the stopper is centrally disposed between the first engagement element and the second engagement element,
    wherein the first engagement element and the second engagement element are on opposite sides of the stopper and adapted to engage with the actuator and the at least one flap, respectively,
    wherein the stopper comprises at least two co-planar radially extending elements adapted to interact with at least two depressions extending inwardly from the second portion of the HVAC housing into the enclosure "E" to define angular movement of the at least one flap, and
    wherein each of the at least two co-planar radially extending elements extends away from a center of the intermediate lever.

2. The HVAC unit as claimed in claim 1, wherein the first portion and the second portion are separate from each other and adapted to be assembled to each other to define the enclosure "E".

3. The HVAC unit as claimed in claim 1, wherein at least one of the first engagement element and the second engagement element is a male feature adapted to engage with a complementary female feature formed on at least one of the respective actuator and the at least one flap.

4. The HVAC unit as claimed in claim 3, wherein the first engagement element is a male star drive.

5. The HVAC unit as claimed in claim 1, wherein at least one of the first engagement element and the second engagement element is a female feature adapted to engage with complementary male feature formed on at least one of the respective actuator and the at least one flap.

6. The HVAC unit as claimed in claim 1, the at least one flap is of polypropylene, polypropylene reinforced with 40 percent talcum, PPT 40 material whereas the intermediate lever is of reinforced glass fiber resin selected from one of PA66 GF30 material and PBT GF30 material.

7. A method of assembling a Heating Ventilation and Air-Conditioning (HVAC) unit, the method comprising:
    installing a flap to a first portion of a HVAC housing by engaging a first extreme end thereof with the first portion of the HVAC housing;
    installing an intermediate lever to a second extreme end of the flap;
    assembling a second portion of the HVAC housing and the flap via the intermediate lever by guiding a portion of the intermediate lever on one side of a stopper formed thereon through a complementary through aperture formed on the second portion of the HVAC housing and limiting a movement of the intermediate lever about an axle of the flap as the stopper is held between the flap and the second portion of the HVAC housing; and
    installing an actuator to at least a portion of the intermediate lever extending out of an enclosure "E" defined by first portion and the second portion of the HVAC housing,
    wherein the intermediate lever comprises a first engagement element at a first end of the intermediate lever and a second engagement element at a second end of the intermediate lever, wherein the stopper is centrally disposed between the first engagement element and the second engagement element;
    wherein the first engagement element and the second engagement element are on opposite sides of the stopper and adapted to engage with the actuator and the at least one flap, respectively,
    wherein the second portion of the HVAC housing comprises at least two depressions extending inwardly into the enclosure "E" to define angular movement of the flap,
    wherein the stopper comprises at least two co-planar radially extending elements adapted to interact with the at least two depressions, and
    wherein each of the at least two co-planar radially extending elements extends away from a center of the intermediate lever.

8. The method of assembling a Heating Ventilation and Air-Conditioning (HVAC) unit as claimed in claim 7, further comprising: mounting a protection cover over the actuator.

* * * * *